United States Patent [19]

Boyd et al.

[11] Patent Number: 5,038,028
[45] Date of Patent: Aug. 6, 1991

[54] OPTICAL SCANNER APERTURE AND LIGHT SOURCE ASSEMBLY

[75] Inventors: David W. Boyd, Greeley; C. William Elder, Jr., Evans, both of Colo.

[73] Assignee: Hewlett-Packard Company, Palo Alto, Calif.

[21] Appl. No.: 525,566

[22] Filed: May 18, 1990

[51] Int. Cl.$^5$ .................. H01J 40/14; H01R 33/00
[52] U.S. Cl. .................. 250/208.1; 362/226; 250/578.1
[58] Field of Search .......... 250/208.1, 578.1, 216, 250/239, 234, 235, 236; 358/497; 355/229, 70; 362/226, 260

[56] References Cited

U.S. PATENT DOCUMENTS

| | | | |
|---|---|---|---|
| 4,082,444 | 4/1978 | Menon et al. | 358/497 |
| 4,345,277 | 8/1982 | Ishikawa | 358/497 |
| 4,442,460 | 4/1984 | Kurata et al. | 358/497 |
| 4,682,042 | 7/1987 | Igarashi | 250/208.1 |
| 4,816,922 | 3/1989 | Futaki | 358/497 |
| 4,870,454 | 9/1989 | Kurusu et al. | 355/229 |
| 4,908,717 | 3/1990 | Natori | 358/497 |
| 4,926,041 | 5/1990 | Boyd | 250/578.1 |
| 4,965,638 | 10/1990 | Hediger | 358/497 |

FOREIGN PATENT DOCUMENTS

| | | | |
|---|---|---|---|
| 0004652 | 1/1982 | Japan | 358/497 |
| 0148270 | 8/1985 | Japan | 358/497 |
| 0003561 | 1/1986 | Japan | 358/497 |

Primary Examiner—David C. Nelms
Assistant Examiner—Michael Messinger

[57] ABSTRACT

An aperture and light source assembly including an elongate aperture plate having a longitudinally extending, aperture defining slit at a top end thereof and a light source for illuminating an object to be scanned including a first elongate bulb and a second elongate bulb positioned adjacent opposite lateral sides of the vertically disposed portion of said aperture plate and below the top end slit therein; a connector and spacer assembly fixedly connecting the bulbs in spaced apart, parallel relationship; and an attachment assembly associated with the connector assembly removably attaching the light source to the optical scanner; and whereby the first and second bulbs are installable and removable from the optical scanner as a modular unit.

11 Claims, 6 Drawing Sheets

OPTICAL SCANNER APERTURE AND LIGHT SOURCE ASSEMBLY

BACKGROUND OF THE INVENTION

The present invention relates generally to optical scanners and, more particularly, to a modular light source for an optical scanner.

Optical imaging devices which utilize a chromatic beam splitter consisting of composited dichroic beam splitter plates which separate a light beam into parallel color component beams are disclosed in U.S. Pat. No. 4,709,144 of Kent J. Vincent; U.S. Pat. No. 4,806,750 of Kent J. Vincent and Hans D. Neuman; and U.S. patent application Ser. No. 383,463 filed 7/20/89 for OPTICAL SCANNER of David Wayne Boyd, now U.S. Pat. No. 4,926,041, which are all hereby specifically incorporated by reference for all that is disclosed therein.

Optical imaging devices require a light source for illuminating documents or other objects which are to be imaged. It is an object of the present invention to provide a light source for an optical imaging device which has a modular construction for enabling quick and easy replacement of the light source if it fails. It is another object of the present invention to provide a modular light source for an optical imaging device which may be used in association with a slit-type aperture. It is another object of the present invention to provide a modular light source for an optical imaging device which is relatively inexpensive to produce.

SUMMARY OF THE INVENTION

The present invention is directed to an aperture and light source assembly for defining an illuminated scan line which is imaged by an imaging lens assembly of an optical scanner.

The assembly comprises an elongate aperture plate which blocks light other than light from the illuminated scan line from entering the imaging lens assembly. The aperture plate includes a vertically disposed portion having a longitudinally extending, aperture defining slit at a top end thereof.

A light source assembly adapted for illuminating an object which is to be scanned is positioned above the elongate aperture plate. The light source assembly includes a first elongate bulb which is adapted to be positioned adjacent to one lateral side of the vertically disposed portion of the aperture plate and below the top end slit therein. A second elongate bulb is adapted to be positioned adjacent to a the other lateral side of the vertically disposed portion of the aperture plate and below the top end slit therein.

A connector and spacer assembly fixedly connects the first elongate bulb in spaced apart, parallel relationship with the second elongate bulb. An attachment device associated with the connector and spacer assembly enables removable attachment of the light source assembly to the optical scanner.

Thus, the first and second bulbs are installable and removable from said optical scanner as a modular unit.

The invention is also directed to a method of installing an optical scanner light source including the steps of coupling two florescent bulbs together in spaced apart parallel relationship and then mounting the coupled bulbs on an optical scanner with each bulb positioned adjacent to a different lateral side of a scan line defining aperture portion of the scanner.

BRIEF DESCRIPTION OF THE DRAWINGS

An illustrative and presently preferred embodiment of the invention is shown in the accompanying drawings in which.

DETAILED DESCRIPTION OF THE INVENTION

Figure 1:
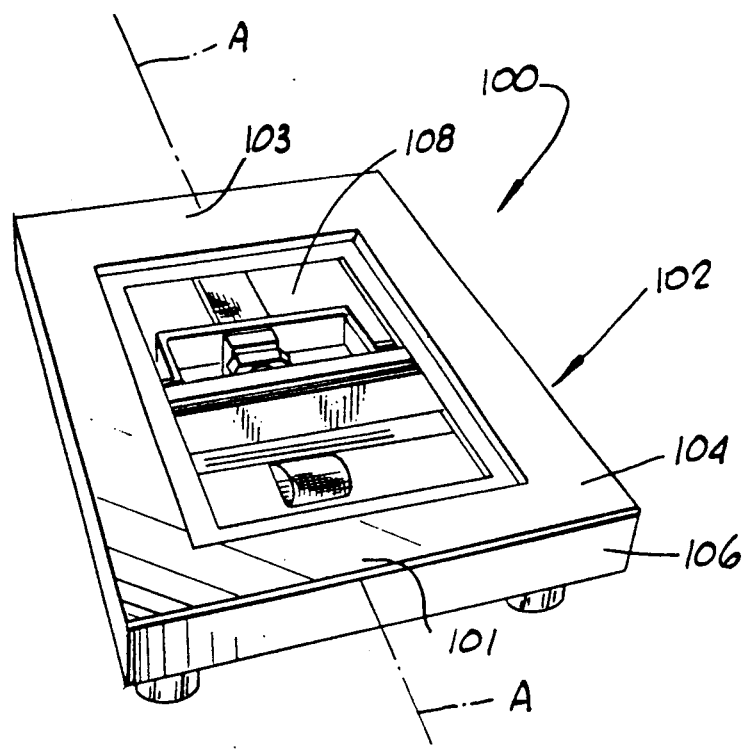
FIG. 1 is a perspective view of an optical scanner.

FIG. 1 illustrates an optical scanner 100 of a type adapted to produce machine readable data representative of a color image of an object which is scanned. The machine readable data produced by the optical scanner 100 is adapted to be received and used by a digital computer in a conventional manner, e.g. the data may be stored on a computer memory device or may be used to produce a color display of the object on a CRT or a color electrostatic print, etc.

Figure 2:
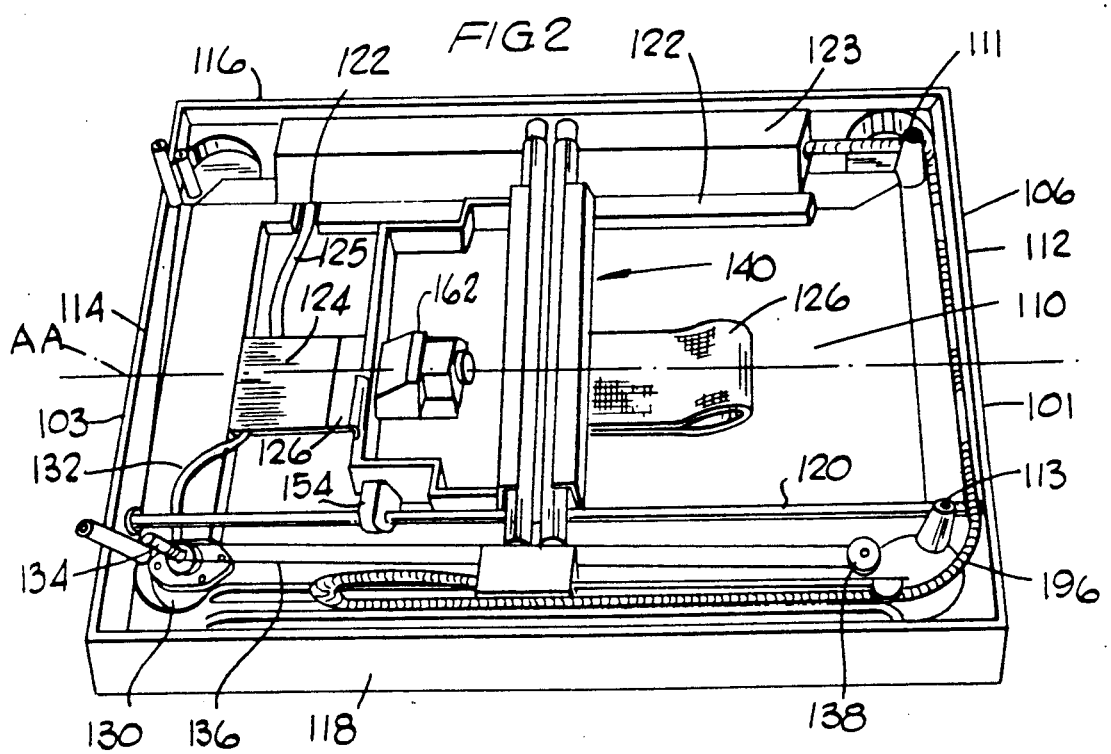
FIG. 2 is a perspective view of an optical scanner with an upper panel removed.

The optical scanner 100 comprises a scanner housing 102 having a forward end 101, a rear end 103 and a central longitudinal axis AA, FIGS. 1 and 2. The housing includes a relatively flat upper panel member 104 and a lower housing member 106, FIGS. 1 and 2. The upper panel member 104 comprises a transparent plate 108 which may be approximately laterally centered therein. The transparent plate 108 is positioned relatively nearer to the forward end 101 than the rear end 103 of the scanner housing. The forward edge of the transparent plate member 108 may be e.g. 72 mm from the forward terminal edge of the scanner housing. The rear edge of the transparent plate 108 may be e.g. 160 mm from the rear terminal edge of the scanner housing.

The lower housing member 106 comprises a generally rectangularly shaped bottom wall 110. A front wall 112, rear wall 114 and lateral sidewalls 116, 118 are integrally formed with the bottom wall 110 and project upwardly therefrom. Post members 111, 113 etc. are provided for attaching the upper panel member to the lower housing member. In one preferred embodiment of the invention the overall length of the housing is 575 mm, the lateral dimension of the housing is 408 mm and the distance from the bottom wall 110 to the upper panel member 104 is 105 mm.

As best illustrated in FIG. 2, a longitudinally extending shaft 120, which may be positioned e.g. 36 mm above the housing bottom wall 110 is supported at opposite ends thereof by brackets mounted on the front and rear housing walls 112, 114. Shaft 120 may be located 79 mm from lateral sidewall 118. A longitudinally extending riser 122, which may be integrally formed with the bottom wall 110 may be positioned e.g. 80 mm from lateral sidewall 116. The upper surface of the riser 122 may be positioned e.g. 37 mm above bottom wall 110.

As further illustrated in FIG. 2, an electrical power supply unit 123 is fixedly mounted to the lower housing member between sidewall 116 and riser 122. An electronic controller board 124 is fixedly mounted on bottom wall 110 at a rear end portion thereof. The controller board 124 receives power from power supply unit 123 through power cable 125. The controller board is electrically connected with a light processing assembly 162 mounted in a carriage assembly 140 through an electrical cable 126.

A reversible electric motor 130 which receives power through electrical supply cable 132 connected to controller board 124 is fixedly mounted the bottom wall at a location proximate lateral wall 118 at a rear end portion of the housing member. The reversible electric motor 130 has a vertical motor shaft 134 and is controlled by the controller board. A carriage assembly drive cable 136 has terminal ends thereof wound about vertical motor shaft 134. An intermediate portion of the cable 136 is received about a pulley 138 which is mounted proximate a forward end of the housing.

As best illustrated in FIG. 2, a scanner carriage assembly 140 is longitudinally displaceably mounted on shaft 120 and riser 122. The scanner carriage assembly 140 is attached to cable 136 which produces reciprocal, longitudinal movement thereof.

Figure 3:
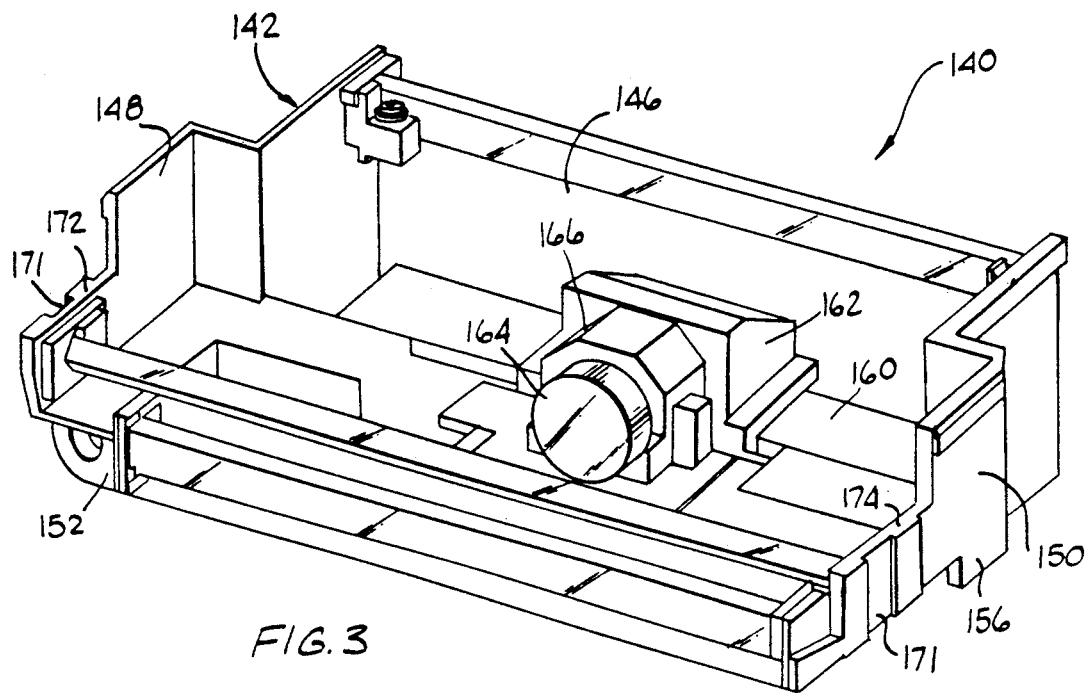
FIG. 3 is a perspective view of an optical scanner carriage assembly with a modular light source and light slit assembly removed therefrom.
Figure 6:
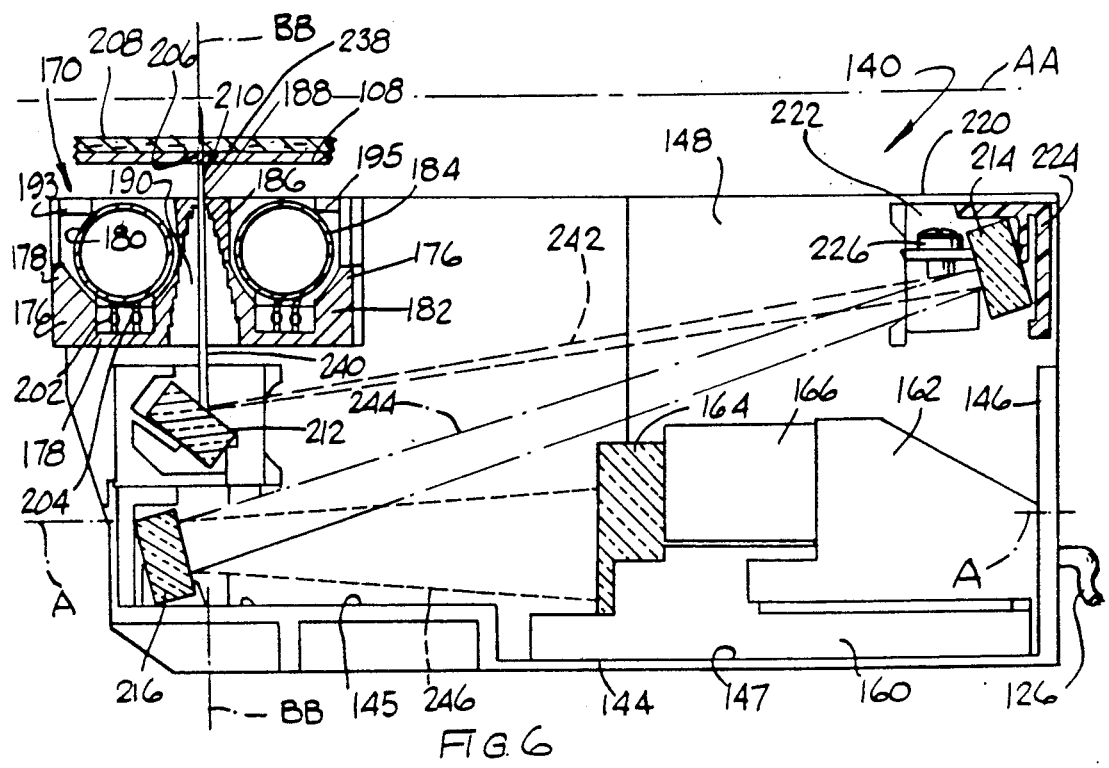
FIG. 6 is a cross-sectional elevation view of an optical scanner carriage assembly illustrating a fixed light path extending from a light slit to a focusing lens.

As best illustrated in FIG. 3, the scanner carriage assembly comprises a carriage body 142 which is preferably constructed from a rigid high strength material, such as aluminum, stainless steel or the like. The body comprises a bottom wall 144 having a two tier structure, including a forward upper tier 145 and rear lower tier 147, as illustrated in FIG. 6. The carriage has a vertical rear wall 146, a vertical first lateral sidewall 148 and a vertical second lateral sidewall 150, FIG. 3. The overall longitudinal dimension of carriage body 142 may be e.g. 146 mm. The maximum width of the carriage body 142 may be e.g. 244 mm.

First and second guide ring members 152, 154, FIGS. 2 and 3, are fixedly attached to the carriage body 142 and are adapted to slidingly receive longitudinally extending shaft 120. A vertically and longitudinally extending guide member 156, which may be integrally formed with lateral sidewall 150, is adapted to be positioned adjacent to an outboard portion of riser 122. The bottom wall 144 of the carriage body is slidingly supported on riser 122. Guide member 156 ensures proper longitudinal tracking of the carriage body 142 along the vertical riser 122.

A centrally mounted support block 160 is fixedly attached to bottom wall 144, FIG. 6. A light processing assembly 162 is fixedly attached to support block 160. The light processing assembly 162 in one preferred embodiment comprises a dual trichromatic beam splitter and photosensor assembly which may be identical to the type described in U.S. Pat. No. 4,806,750 of Kent D. Vincent, which is hereby specifically incorporated by reference for all that is disclosed therein. A double convex lens assembly 164 is adjustably mounted at a position directly forward of light processing assembly 162 by a tubular mounting assembly 166. In one preferred embodiment of the invention the double convex lens 164 assembly comprises a lens having a 31 mm diameter, a 42 mm focal length, and a magnification of 0.126.

Figure 4:
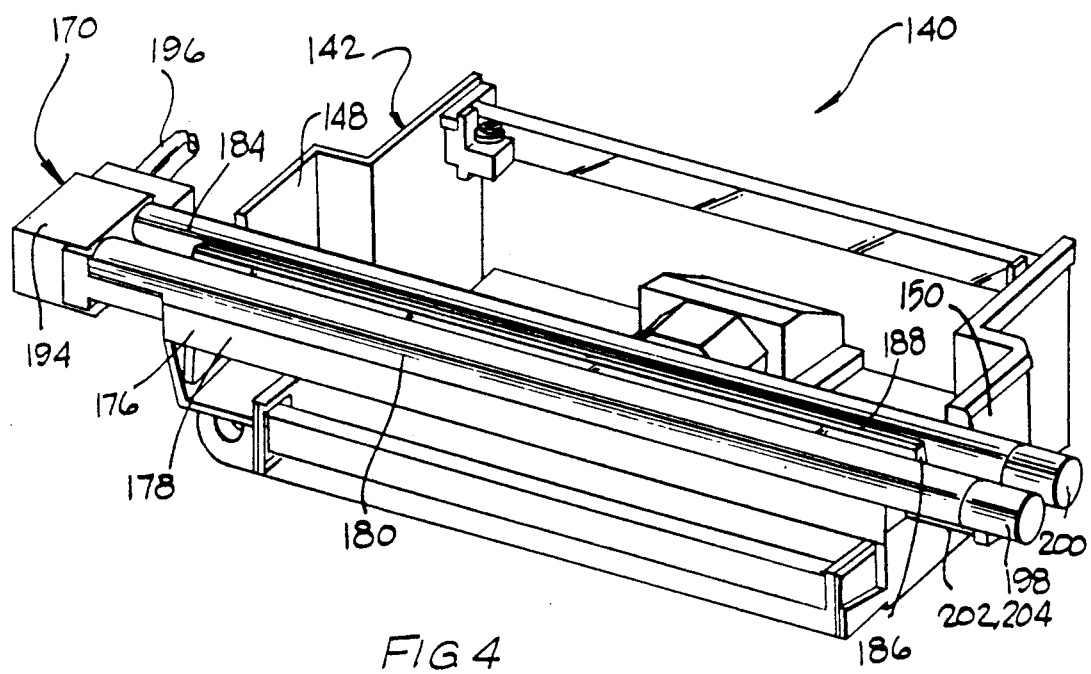
FIG. 4 is a perspective view of an optical scanner carriage assembly.

As best illustrated by FIGS. 4 and 6, a modular light source and light slit or aperture assembly 170 is stationarily mounted at a forward location on the carriage body 140. In the preferred embodiment of the invention illustrated by the drawings, the lateral sidewalls 148, 150 each comprise a forward cut-out region therein which define horizontal surfaces 172, 174 adapted to support assembly 170. A locking assembly 171 is associated with each support surface 172, 174 and is adapted to cooperate with a catch assembly (not shown) provided on a lower surface of the modular light source and light slit assembly 170 to hold assembly 170 in stationary relationship with the carriage body at a predetermined location thereon.

The modular light source and light slit assembly 170 comprises an elongate member 176 having a generally W-shaped cross-section, as shown by FIG. 6. The elongate member 176 has a forward portion 178 having generally U-shaped cross-section which is adapted for supporting a first fluorescent bulb 180 which may have a diameter of 15.5 mm. The elongate member 176 also comprises a rear portion 182 having a generally U-shaped cross-section for supporting a second fluorescent bulb 184. The elongated member 176 has a central riser portion 186. A narrow light slit or aperture 188 is located at the top of riser portion 186 and extends substantially the full length thereof. The light slit 188 communicates with a generally inverted V-shaped cavity 190 within the central riser portion 186. The inverted V-shaped cavity 190 also extends substantially the full length of the riser. The narrow slit 188 may comprise a length, measured transversely with respect to the housing longitudinal axis AA, of 234 mm. The slit width, measured parallel to axis AA, may be e.g. 0.8 mm. The inverted V-shaped cavity may have a width at the upper end thereof of e.g. 0.8 mm and a width at the bottom end thereof of e.g. 7.5 mm and may have a height of e.g. 215 mm. The surface of the inverted V-shaped cavity 190 may have a generally inverted stair step shape, each inverted stair step having a height of e.g. 2 mm and a horizontal dimension of, e.g., 0.2 mm. An electrical socket member 194, FIG. 4, is fixedly attached to one end of elongate member 176 and comprises two conventional fluorescent bulb female sockets therein adapted to receive conventional male socket portions of fluorescent bulbs 180 and 184, respectively. A flexible power cable 196 is operably attached to socket member 194 for providing electrical current to bulbs 180, 184. Independent end sockets 198, 200 are provided at the end of each fluorescent bulb and make electrical contact with male socket portions thereof. Each socket 198, 200 is connected by a pair of lead wires 202, 204 to an associated portion of socket member 194. Shield members 193, 195 (shown in FIG. 6 only) may be provided to reflect light from the bulbs 180, 184 toward an object such as color document 208, which is to be scanned.

Light slit 188 passes light reflected from a narrow band region 206 of document 208 and blocks all other light reflected from the document, FIG. 6. The region 206 from which light is reflected of course changes as scanner carriage assembly 140 moves relative to document 208. However, for purposes of explaining image formation, etc., it is helpful to visualize the scanner carriage assembly 140 and narrow band region 206 in a static position. Narrow band region 206 is sometimes referred to herein as "scan line" or "scan object" 206.

As illustrated by FIG. 6, some of the light from fluorescent bulbs 180, 184, which is reflected from a narrow band scan region 206 of document 208 and which ultimately enters lens 165 travels along a light path 210 which passes through slit 188 and inverted V-shaped cavity 190. Light path 210 is thereafter "folded" by a first mirror 212, a second mirror 214 and a third mirror 216 before passing through focusing lens 165. Light path 210 thereafter passes through tubular member 166 into light processing assembly 162 and terminates at photosensor assembly 252 therein, FIG. 9. Each mirror 212, 214, 216 may have a width of e.g. 127 mm and is held in position by a pair of mounting assemblies, e.g. 220, 221, FIG. 5, which may comprise a bracket member 222 which is fixedly attached to an associated lateral sidewall of the carriage assembly and a clip member 224 which attaches an end portion of each mirror to the associated bracket members 222. In the case of mirror 214, a mirror angular adjustment assembly 226 is also provided for adjusting the relative angular position of mirror 214 about an axis extending perpendicularly of axis AA. The mirror mounting assemblies may be identical to those which are specifically described in U.S. patent application Ser. No. 345,384, filed May 1, 1989, of David Wayne Boyd, which is hereby specifically incorporated by reference for all that is disclosed therein.

Figure 5:
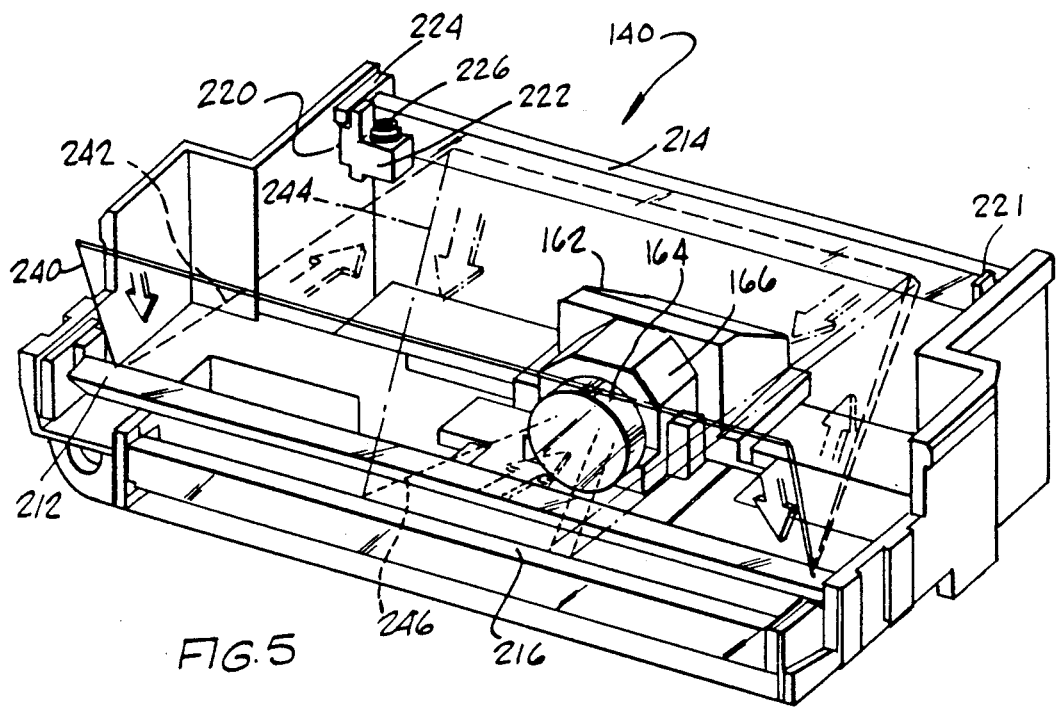
FIG. 5 is a perspective view of an optical scanner carriage assembly with a modular light source and light slit assembly removed therefrom, illustrating a fixed light path which extends from a light slit to a focusing lens.

As best illustrated in FIGS. 5 and 6, light path 210 comprises a first vertically downwardly extending light path portion 238 extending between scanned document 208 and light slit 188; a second vertically downwardly extending light path portion 240 extending from slit 188 to mirror 212; a third generally rearwardly and upwardly extending light path portion 242 extending between mirror 212 and mirror 214; a fourth generally downwardly and forwardly extending light path portion 244 extending between mirror 214 and mirror 216; and a fifth generally rearwardly extending light path portion 246 extending between mirror 216 and the forward surface of lens 165.

Figure 7:
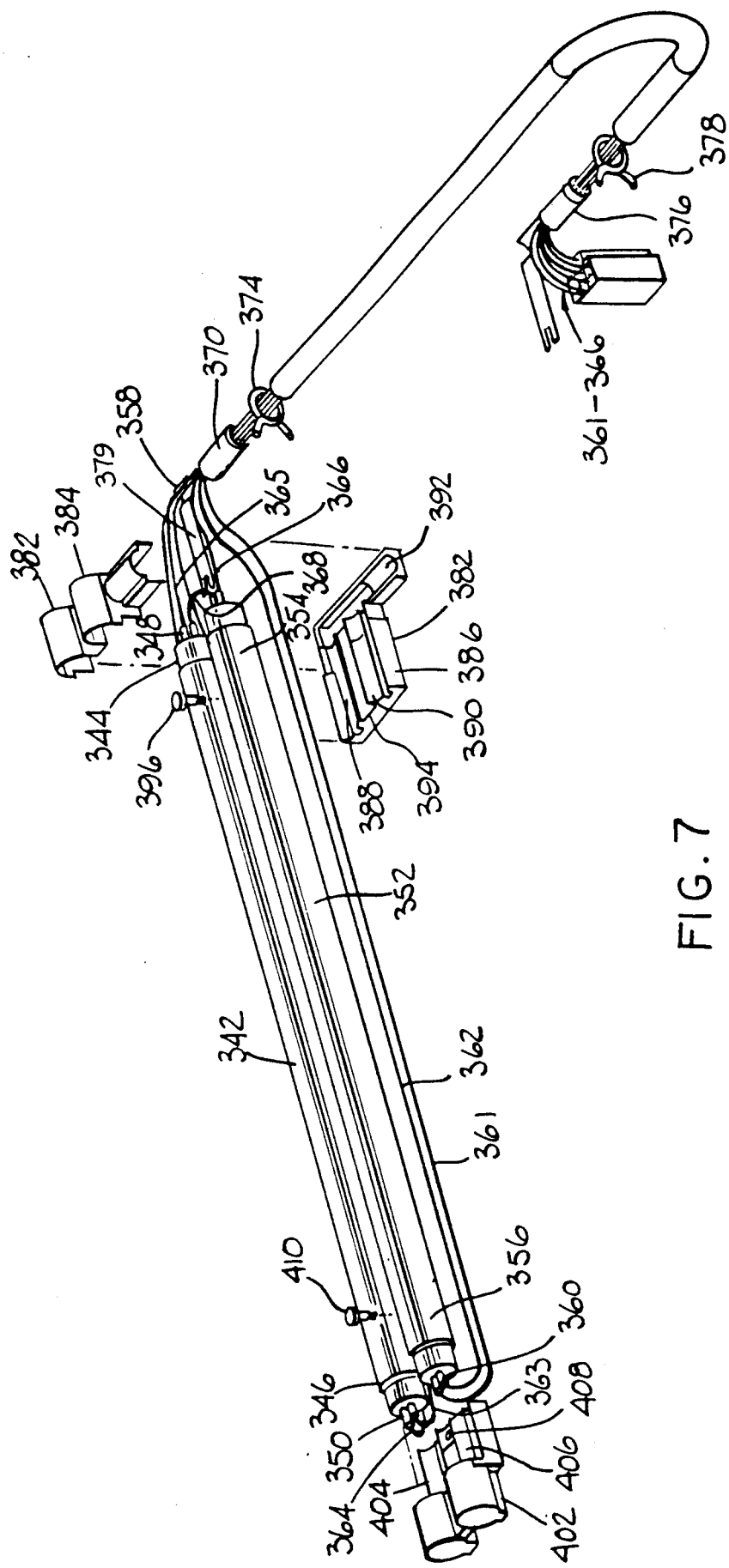
FIG. 7 is an exploded perspective view of an optical scanner light source assembly.
Figure 8:
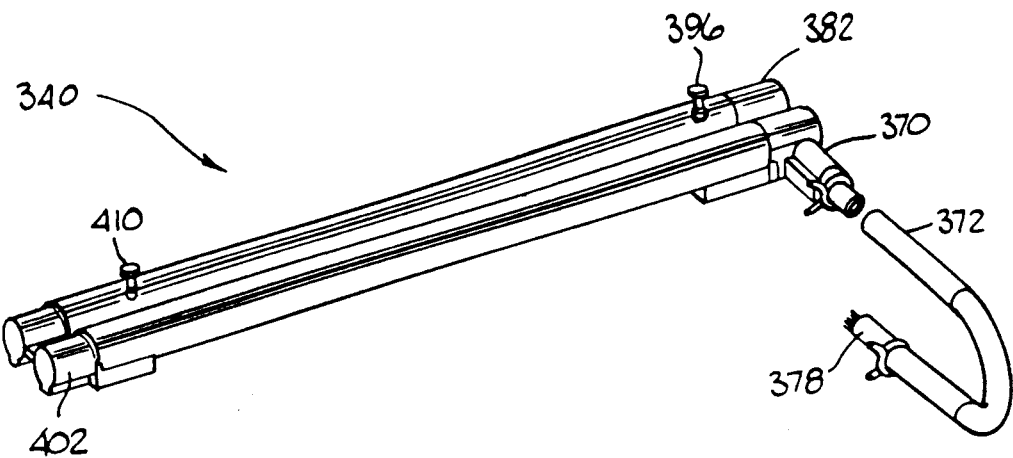
FIG. 8 is an assembled perspective view of the optical scanner light source assembly of FIG. 7.
Figure 9:
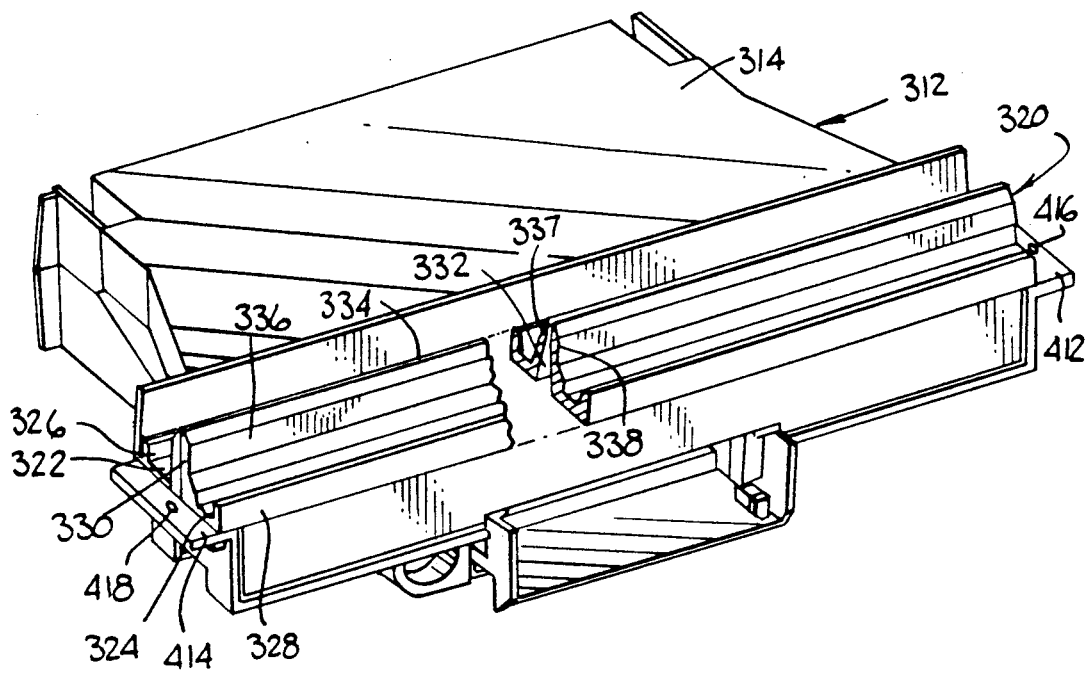
FIG. 9 is a perspective view of an optical scanner light slit assembly mounted on an optical scanner carriage.

Another embodiment of an aperture and light source assembly 310 is illustrated in FIGS. 7-11. The aperture and light source assembly 310 is used in association with an optical scanner carriage 312 having a cover plate 314 thereon which may be similar or identical in construction to the carriage assembly 140 described above. As best illustrated in FIG. 9, the aperture and light source assembly comprises an elongate aperture plate 320 having a first horizontally extending portion 322, a second horizontally extending portion 324, a first upwardly projecting flange portion 326 integrally formed with the first horizontally extending portion 322, a second upwardly projecting flange portion 328 integrally formed with the second horizontally extending portion 324, and a central vertical portion 330 integrally formed with the horizontally extending portions 322, 324. The central vertical portion 330 comprises a generally inverted V-shaped interior cavity 322, which may be identical to cavity 190 described above, which is intersected by a longitudinally extending slit 334 provided at a top end portion 336 of the central vertical portion 330. The elongate aperture plate 320 may be supported on a recessed peripheral structure (not shown) provided on carriage 312 which enables drop-in mounting of the elongate plate on the carriage.

Figure 10:
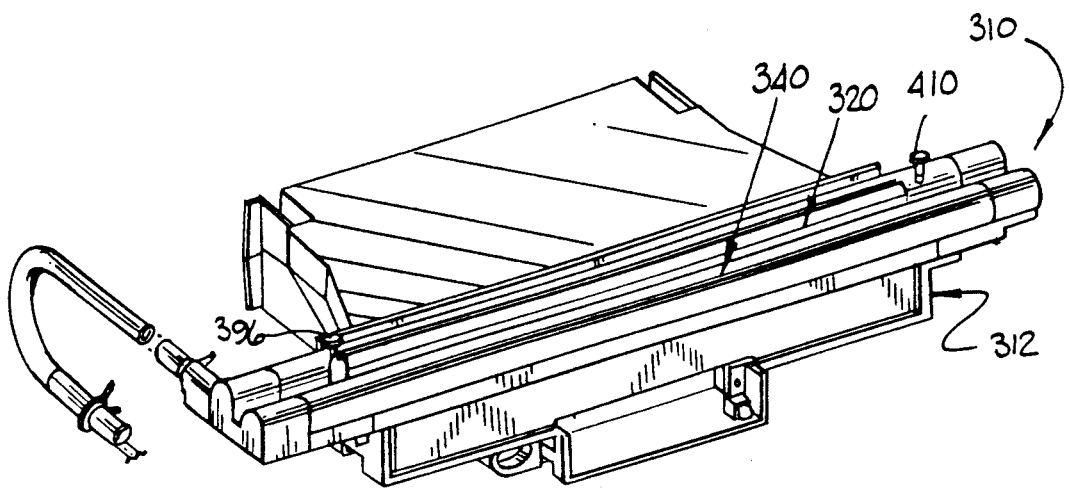
FIG. 10 is a perspective view of an optical scanner carriage assembly including the light source assembly and light slit assembly of FIGS. 8 and 9.
Figure 11:
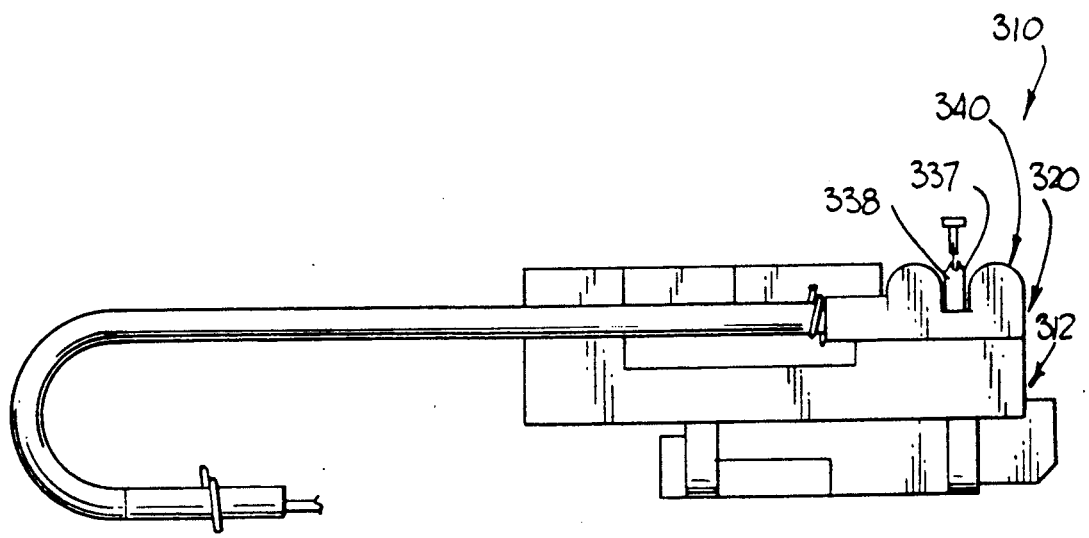
FIG. 11 is a side elevation view of the optical scanner carriage assembly of FIG. 10.

As best illustrated in FIGS. 7, 8 and 10, the aperture and light source assembly 310 also comprises a light source assembly 340 which includes first and second fluorescent bulbs 342, 352 which are adapted to be positioned adjacent first and second lateral sides 337, 338 of the central vertical portion 330 of the elongate aperture plate 320. The first fluorescent bulb 342 comprises a first end 344, a second end 346, and has a pair of first end male electrical terminals 348 and a pair of second end male electrical terminals 350 of conventional construction. The second fluorescent bulb similarly comprises a first end 354, a second end 356, and a first and second pair of male terminals 358, 360 thereon. Electrical lead cables 361-366 are soldered to each of the second end male terminals of each terminal pair 346, 356 and to one of the first end male terminals in each terminal pair 344, 354. A seventh electrical cable 368 is connected to one male electrical terminal of the first bulb first end terminal pair 348 and to one terminal on the second bulb first end terminal pair 358. By soldering the leads directly to the terminals in this fashion, the need for relatively expensive electrical sockets at each end of the bulbs is eliminated. The leads 361-364 attached to the second ends of the bulbs are looped back and extended parallel to and below each associated bulb in the direction of the first end and are thereafter grouped together with first end leads 365 and 366 and passed through a first ground strap 370. The leads 361-366 thereafter pass through a lead cable shield 372 which is attached to the first ground strap 370 by a first shield clip 374. The leads 361-366 thereafter pass through a second ground strap 376 which is attached to the second end of the lead cable shield 372 by a second shield clip 378. The six leads thereafter emerge from the ground strap 376 and are electrically attached to a conventional six-contact electrical connector 380 which is in turn connected to power supply 123, FIG. 2.

A first end connector and spacer assembly 382 comprising an upper portion 384 and a lower portion 386 defines a first bulb enclosure 388 and a second bulb enclosure 390 and a lead cable enclosure 392 which extends perpendicular to the first and second bulb enclosure 388, 390. First and second bulb enclosures are provided with channel recesses in lower portions thereof which allow cables 361-364 to be extended therethrough to lead cable enclosure 392. A screw hole 394 (only one shown) is provided in each of the upper and lower portions 384, 386 of the first end connector and spacer assembly and enables the connector and spacer assembly to be attached by means of a screw 396 to a threaded bore 418 in bracket portion 414 of carriage 312, FIG. 9. A second end connector and spacer assembly 402 having a unitary body construction defines a first enclosure 404 for accepting second end 346 of first bulb 342 therein and comprises a second enclosure 406 for accepting the second end 356 of second fluorescent bulb 352 therein. Recesses are provided in the lower portion of each of the enclosures 404, 406 for accommodating cables 361-364. A screw hole 408 is provided in second end connector and spacer assembly 402 for enabling attachment of the assembly to a carriage second end bracket 412 having a threaded bore 416 therein by means of threaded screw 410.

Screw 396 which attaches first connector and spacer assembly 382 to carriage bracket 412 also connects a screw receiving portion such as 379 of the first ground strap 370 to the carriage, thus grounding the end strap on the carriage. In a preferred embodiment of the invention, the first and second end connector and spacer assemblies 382, 402 are constructed from molded plastic, and the elongate aperture plate 320 is constructed from die case aluminum. The diameter of each of the bulbs 342, 352 is sufficiently small to prevent the bulbs from extending above the light slit 334. The dimensions of the first and second end connector and spacer assemblies 382 and 402 are such that each of the bulbs is positioned a small distance, e.g. 2.4 mm, above an associated horizontally extending portion 322, 324 of the elongate aperture plate 320. The spacing between the bulb and the aperture plate accommodates the extension of cables 361–364 therebetween.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. An aperture and light source assembly for defining an illuminated scan line which is imaged by an imaging lens assembly of an optical scanner comprising:
    elongate aperture plate means for blocking light other than light from said illuminated scan line from entering said imaging lens assembly comprising a vertically disposed portion having a longitudinally extending, aperture defining slit at a top end thereof; and
    light source means for illuminating an object to be scanned which is positioned above said elongate aperture plate means comprising:
    first elongate bulb means for illuminating the object to be scanned from a position adjacent to a first lateral side of said vertically disposed portion of said aperture plate means and below said top end slit therein;
    second elongate bulb means for illuminating the object to be scanned from a position adjacent to a second lateral side of said vertically disposed portion of said aperture plate means and below said top end slit therein;
    connector and spacer means for fixedly connecting said first elongate bulb means in spaced apart, parallel relationship with said second elongate bulb means, a modular lighting unit being defined by said first and second bulb means and said connector and spacer means; and
    attachment means operably associated with said connector means for removably attaching said modular lighting unit to said optical scanner; whereby said first and second bulb means are modularly installable and removable from said optical scanner.

2. The invention of claim 1 wherein said connector and spacer means comprises a first coupling assembly attached to a first end portion of said first bulb means and to a first end portion of said second bulb means.

3. The invention of claim 2 wherein said connector and spacer means comprises a second coupling assembly attached to a second end portion of said first bulb means and to a second end portion of said second bulb means and longitudinally spaced apart from said first coupling assembly by a distance greater than the length of said aperture defining slit.

4. The invention of claim 3 wherein said attachment means comprises a first screw receivable through a bore in said first coupling assembly and threadably connectable to a threaded bore provided on said scanner in fixed relationship with said aperture plate means.

5. The invention of claim 4 wherein each of said bulb means comprise fluorescent bulbs having male electrical connectors provided at both ends thereof and further comprising electrical leads for connecting said bulbs to an electrical power supply, wherein said electrical leads are connected to said electrical connectors on said bulbs by solder, whereby the need for electrical sockets is eliminated.

6. The invention of claim 5 wherein said first and second coupling assemblies comprise molded plastic components.

7. The invention of claim 6 wherein said first coupling assembly comprises a pair of parallel enclosures for accommodating said bulb means and comprises a third enclosure oriented perpendicular to said parallel enclosures for accommodating said electrical leads.

8. A method of providing an optical scanner light source comprising the steps of:
    coupling two fluorescent bulbs together in spaced apart parallel relationship; and
    mounting the coupled bulbs on an optical scanner with each bulb positioned adjacent a different lateral side of a scan line defining aperture portion of the scanner.

9. The method of claim 8 wherein the step of mounting the coupled bulbs comprises positioning the coupled bulbs below the scan line defining aperture and an object which is to be scanned.

10. The method of claim 8 wherein the step of coupling the two fluorescent bulbs comprises permanently, physically coupling and electrically connecting the two fluorescent bulbs together whereby the bulbs are installable and removable from the optical scanner only as a coupled unit.

11. The invention of claim 10 wherein the step of mounting the coupled bulbs comprises screwingly attaching the coupled bulbs to the scanner by means of screws located proximate opposite end portions of the coupled bulbs whereby the bulbs are held in scan-linewise longitudinally immobile relationship with the optical scanner.

* * * * *